Aug. 27, 1946.   W. K. ROBBINS   2,406,712
CHAIN LINK
Filed Feb. 5, 1944

INVENTOR
WILLIAM K. ROBBINS
By Brayton Richards
ATTORNEY

Patented Aug. 27, 1946

2,406,712

UNITED STATES PATENT OFFICE 2,406,712

CHAIN LINK

William K. Robbins, Chicago, Ill.

Application February 5, 1944, Serial No. 521,189

5 Claims. (Cl. 59—84)

The invention relates to improvements in chain links and has for its primary object the provision of a chain link made of separable members which may be readily assembled when desired, either with similar links or with integral links to constitute a chain, which is capable of economical production and highly efficient in use.

Other objects will appear hereinafter.

The invention consists of the combinations and arrangements of parts hereinafter described and claimed.

The invention will be best understood by reference to the accompanying drawing forming a part of this specification and in which—

Figure 1:
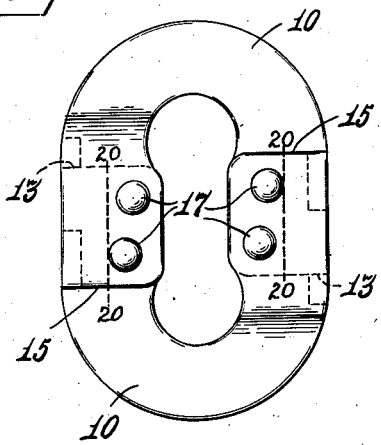
Figure 2:
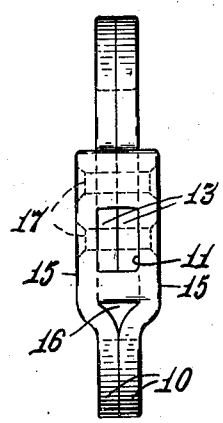
Figure 3:
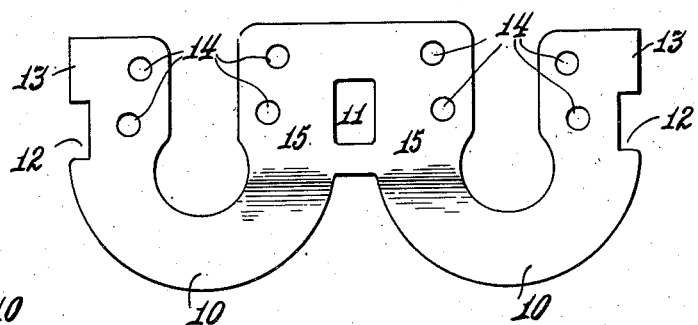
Figure 4:
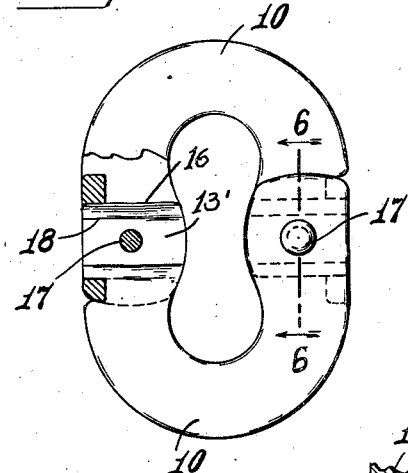
Figure 5:
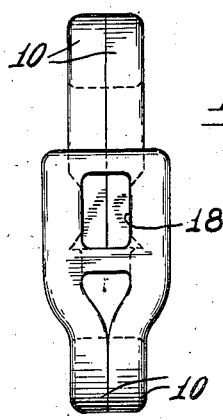

Fig. 1 is a face view of a chain link embodying the invention and shown in assembled condition;

Fig. 2, an edge view thereof;

Fig. 3, a view of the blank from which the separable link members are formed;

Fig. 4, a view similar to Fig. 1 but showing a slightly modified form of construction;

Fig. 5, an edge view of the link shown in Fig. 4; and

Figure 6:
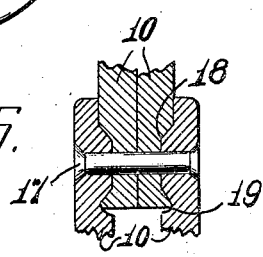

Fig. 6, a section taken substantially on line 6—6 of Fig. 4.

The embodiment of the invention illustrated in Figs. 1, 2 and 3 comprises two substantially U-shaped separable link members, each consisting of a blank composed of two similar parts 10 folded into juxtaposition to constitute a complete link half or member having limbs of twice the thickness of material as shown. The said blank, when formed, is provided with a central opening 11, arranged as indicated along the central line of fold, with notches 12 in each outer edge forming adjacent projections 13. The blank is also provided with suitable rivet holes 14 and the arrangement is such that when the blank is folded centrally upon itself, the parts 10 are brought into juxtaposition with the central portions 15 separated slightly to form a receiving socket 16 adapted and arranged to receive the associated projections 13 on the end of the other limb of the other link member, as will be readily understood.

The notches 12, the projections 13 and rivet holes 14 are thus also brought into registration with each other forming a composite head 13', adapted and arranged to fit into socket 16 and engage opening 11 of the other link member to form interlocking elements between the link members and providing transverse rivet holes for the reception of the securing rivets 17. In this way a chain link is provided which may be readily formed by stamping or forging operations, and may therefore be economically produced. It will also be noted that the rivets 17 and the interlocking projections 13 are located on opposite sides of the lines of strain on each link limb which are approximately on lines 20—20 of Fig. 1, thereby adequately resisting said strains with a minimum of material.

In the modifications illustrated in Figs. 4, 5, and 6 interlocking ribs 18 and corresponding grooves 19 are formed in the link parts to constitute further interlocking elements between them. Otherwise the constructions are substantially the same. Such a construction may be readily made by ordinary forging operations and will afford a very secure interlocking engagement between the link members. In this instance, a single rivet 17 is employed for securing the link members together.

While I have illustrated and described the preferred forms of construction for carrying the invention into effect, these are capable of variation and modification without departing from the spirit of the invention. I therefore do not wish to be limited to the precise details disclosed, but desire to avail myself of such variations and modifications as fall within the scope of the appended claims.

I claim:

1. A chain link comprising two substantially U-shaped separable link members, each consisting of a blank composed of two similar parts foldable into juxtaposition and provided with interlocking elements; and means for securing said members against separation.

2. The construction specified in claim 1 in which said interlocking elements consist of a head formed at the end of one limb of each link member and a socket formed at the end and between the members of the other limb to receive the head on the other link member.

3. The construction specified in claim 1 in which said interlocking elements consist of a head formed at the end of one limb of each link member and a socket formed at the end and between the members of the other limb to receive the head on the other link member, there being an inwardly spaced opening formed in each blank at the fold and a correspondingly positioned notch in the outer edge of each of said parts forming a projection fitting into said opening in the other link member when they are assembled.

4. The construction specified in claim 1 in which the securing means and interlocking elements are located on opposite sides of the lines of strain.

5. The construction specified in claim 1 in which said interlocking elements consist of a head formed at the end of one limb of each link member and a socket formed at the end and between the members of the other limb to receive the head on the other link member, there being an inwardly spaced opening formed in each blank at the fold and a correspondingly positioned notch in the outer edge of each of said parts forming a projection fitting into said opening in the other link member when they are assembled; and securing means are provided for each limb of said assembled members located on opposite sides of the lines of strain from said interlocking openings and projections.

WILLIAM K. ROBBINS.